Patented Nov. 14, 1939

2,179,783

UNITED STATES PATENT OFFICE 2,179,783

PROCESS FOR THE PRODUCTION OF TETRAZYLAZIDE AND THE SALTS THEREOF

Walter Friederich and Karl Flick, Troisdorf, Bez. Cologne, Germany, assignors to Dynamit-Aetien-Gesellschaft, vormals Alfred Nobel & Co., Troisdorf, near Cologne, Germany No Drawing. Application December 17, 1938, Serial No. 246,496. In Germany May 7, 1937

2 Claims. (Cl. 260—308)

This application pertains to a novel method of preparing tetrazylazide and its salts.

It is the object of the present invention to provide a process of producing tetrazylazide in large quantities in a simple manner.

Tetrazylazide and its salts have been produced heretofore only in small quantities and in a comparatively cumbersome manner. Such processes are, for example, described in Beilstein's Handbuch der Organischen Chemie, Vierte Auflage, Band XXVI, 1938, page 110.

I have now found that tetrazylazide and salts thereof can be easily prepared by the reaction of cyanogen halides upon solutions of hydrazoic acid or solutions of azides of the alkali and alkaline earth metals with the simultaneous formation of the hydrohalic acid or salts of the hydrohalic acid respectively. The reaction takes place easily and with a very good yield.

The following examples are illustrative of my new method:

*Example 1.*—40 grams of cyanogen bromide or 23 grams of cyanogen chloride are poured, while stirring, into 1 liter of water in which 49 grams of sodium azide have been dissolved. The conversion is completed after a reaction period of from a quarter of an hour to several hours and can be expressed by the following equation:

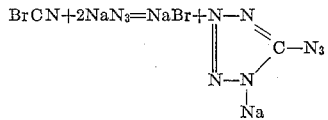

The sodium salt in the tetrazylazide thus formed remains in solution. This solution, which, in addition, contains also dissolved bromide of sodium, can be directly employed in the forming of other tetrazylazide compounds without insolating the sodium salt.

*Example 2.*—40 grams of cyanogen bromide (or 23 grams of cyanogen chloride) and 84 grams of barium azide are poured, while stirring, into 1 liter of 96% alcohol and acidified with 10–20 c. cm. hydrochloric acid. The reaction proceeds according to the following equations:

$$2BrCN + 2Ba(N_3)_2 + 2HCl = BaCl_2 + BaBr_2 + 2HCN_7$$

$$2BrCN + 2Ba(N_3)_2 = BaBr_2 + Ba(CN_7)_2$$

With moderate concentration of the reaction mixture the chloride of barium and the bromide of barium are separated, and, provided not too much hydrochloric acid is used, the tetrazylazide as also the barium salt of the tetrazylazide remain in solution. This solution is then adulterated with only a very small quantity of chloride of barium and bromide of barium, and is a technically pure solution of barium tetrazylazide and free tetrazylazide. Barium tetrazylazide can be obtained from this solution by further concentration and crystallisation.

*Example 3.*—40 grams of cyanogen bromide (or 23 grams of cyanogen chloride), are added, while stirring, to approximately 350–400 c. cm. of 5% aqueous solution of hydrazoic acid, which contains 25 grams of sodium azide. The reaction proceeds according to the following equation:

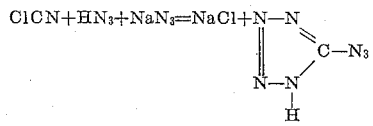

The tetrazylazide formed may be recovered as described in the foregoing examples.

*Example 4.*—49 grams of sodium azide and 40 grams of cyanogen bromide (or 23 grams of cyanogen chloride) are warmed, while stirring, in 1 liter of alcohol (96%) on a water bath. Instead of alcohol, acetone may be used. The sodium salt of the tetrazylazide may be separated as described above.

As a result of the newly discovered reaction, tetrazylazide and its salts have been made easily available to the trade, and due to their comparatively small cost of production they can serve as initial materials for the manufacture of explosives.

We claim:

1. The process for the production of tetrazylazide and its salts which comprises reacting cyanogen halides with a solution of a member of the group consisting of hydrazoic acid, alkali metal azides and alkaline earth metal azides.

2. The process for the production of tetrazylazide and its salts which comprises reacting a member of the group consisting of cyanogen bromide and cyanogen chloride with a solution of a member of the group consisting of hydrazoic acid, alkali metal azides and alkaline earth metal azides.

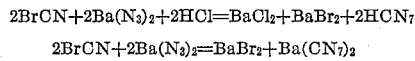
WALTER FRIEDERICH.
KARL FLICK.